(12) United States Patent
Hong et al.

(10) Patent No.: US 10,497,166 B2
(45) Date of Patent: Dec. 3, 2019

(54) HOME FILLING METHOD USING ESTIMATED SPATIO-TEMPORAL BACKGROUND INFORMATION, AND RECORDING MEDIUM AND APPARATUS FOR PERFORMING THE SAME

(71) Applicant: Foundation of Soongsil University—Industry Cooperation, Seoul (KR)

(72) Inventors: Min-Cheol Hong, Seoul (KR); Beomsu Kim, Seoul (KR); Tien-Daht Nguyen, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 23 days.

(21) Appl. No.: 15/710,442

(22) Filed: Sep. 20, 2017

(65) Prior Publication Data

US 2018/0357813 A1  Dec. 13, 2018

(30) Foreign Application Priority Data

Jun. 9, 2017  (KR) ........................ 10-2017-0072427

(51) Int. Cl.
*G06T 15/04* (2011.01)
*G06T 7/90* (2017.01)
(Continued)

(52) U.S. Cl.
CPC .............. *G06T 15/04* (2013.01); *G06T 5/005* (2013.01); *G06T 5/50* (2013.01); *G06T 7/90* (2017.01);
(Continued)

(58) Field of Classification Search
CPC ......... G06T 15/205; G06T 7/12; G06T 15/20; G06T 2207/10012; G06T 2207/10028;
(Continued)

(56) References Cited

U.S. PATENT DOCUMENTS

2017/0188002 A1* 6/2017 Chan .................... H04N 13/128

FOREIGN PATENT DOCUMENTS

JP          5879528 B2    3/2016
KR  10-2013-0067474 A    6/2013

OTHER PUBLICATIONS

Choi, Sunghwan, Bumsub Ham, and Kwanghoon Sohn. "Space-time hole filling with random walks in view extrapolation for 3D video." IEEE Trans. Image Processing 22.6 (2013): 2429-2441. (Year: 2013).*

(Continued)

*Primary Examiner* — Xiao M Wu
*Assistant Examiner* — Scott E Sonners
(74) *Attorney, Agent, or Firm* — Novick, Kim & Lee, PLLC; Sang Ho Lee

(57) ABSTRACT

Provided are a hole filling method using estimated spatio-temporal background information and a recording medium and apparatus for performing the same. The present disclosure is providing a hole filling method using estimated spatio-temporal background information, the hole filling method being capable of estimating temporal background information, estimating spatial background information, and merging the temporal background information and the spatial background information to perform a hole filling process, and a recording medium and apparatus for performing the same.

15 Claims, 8 Drawing Sheets

(51) Int. Cl.
  *G06T 19/20* (2011.01)
  *G06T 15/20* (2011.01)
  *G06T 5/00* (2006.01)
  *G06T 5/50* (2006.01)
  *H04N 13/111* (2018.01)

(52) U.S. Cl.
  CPC ............ *G06T 15/20* (2013.01); *G06T 15/205* (2013.01); *G06T 19/20* (2013.01); *G06T 2207/10016* (2013.01); *G06T 2207/10024* (2013.01); *G06T 2207/10028* (2013.01); *G06T 2207/30196* (2013.01); *H04N 13/111* (2018.05)

(58) Field of Classification Search
  CPC ....... G06T 5/005; G06T 7/97; G06T 2200/04; G06T 2207/20112; G06T 2207/20228; G06T 5/50; G06T 7/13; G06T 7/136; G06T 7/593; G06T 7/11; G06T 7/194; G06T 7/223; G06T 7/70; G06T 7/90; H04N 19/00; H04N 19/17; H04N 19/182; H04N 19/23; H04N 19/29; H04N 19/503; H04N 19/507; H04N 19/86; H04N 5/272
  See application file for complete search history.

(56) References Cited

OTHER PUBLICATIONS

Huu-Noi Doan "A Spatial-Temporal Hole Filling Approach with Background Modeling and Texture Synthesis for 3D Video", Thesis for the Degree of Master, Department of Information and Telecommunication, Graduate School of Soongsil University, Jun. 2015 (Year: 2015).*

Doan, Huu-Noi, and Min-Cheol Hong. "A spatial-temporal hole filling approach with background modeling and texture synthesis for 3D video." Proceedings of the 2015 Conference on research in adaptive and convergent systems. ACM, 2015. (Year: 2015).*

Muddala, Suryanarayana M., Roger Olsson, and Mårten Sjöström. "Spatio-temporal consistent depth-image-based rendering using layered depth image and inpainting." EURASIP Journal on Image and Video Processing 2016.1 (2016): 9. (Year: 2016).*

Doan, Huu-Noi, Tien-Dat Nguyen, and Min-Cheol Hong. "Hole-Filling Algorithm with Spatio-Temporal Background Information for View Synthesis." IEICE Transactions on Information and Systems 100.9 (2017): 1994-2004. (Year: 2017).*

* cited by examiner

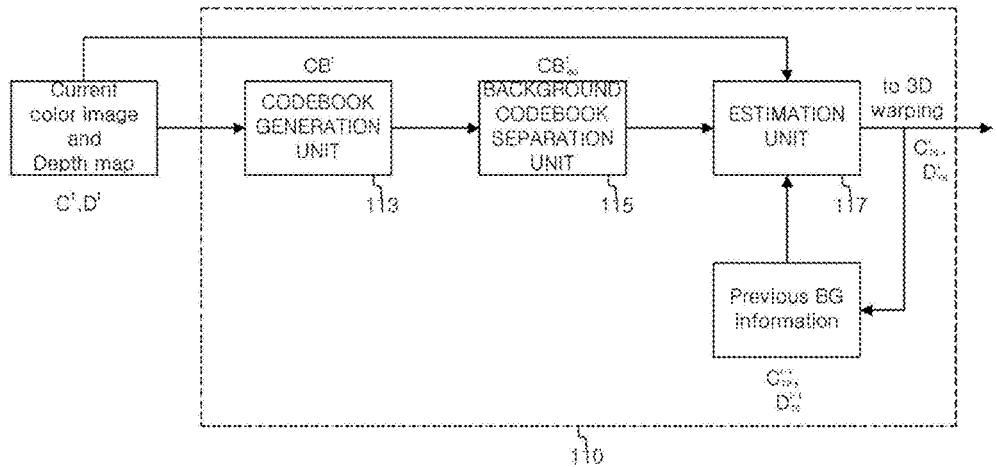

Algorithm 1 Codebook generation

Step 1: Codebook of $P_i$ is initialized as $CB_i = \emptyset$ and $L=0$ at $t=0$
Step 2: Codeword $c_i$ corresponding to $P_i$ is found in
codebook $CB_i = \{c_l \mid 1 \leq L\}$ as follows.
(a) $T1_i$ = colordistortion($p_i, \bar{p}_i$).
(b) $T2_i$ = brightness($I_i, AUX_i$).
(c) $T3_i$ = disparity($d_i, AUX_i$).

(d) $C_i = \begin{cases} \text{matched} & \text{if}\left(T_i = \prod_{i=1}^{3} T_i = 1\right) \\ \text{mismathched} & \text{otherwise} \end{cases}$ Step 3: When there is no corresponding codeword, $L \leftarrow L+1$ and
new codeword $c_i^l$ is set and generated as follows.
$\bar{P}_i \leftarrow P_i$,
$AUX_i \leftarrow [I_i, I_i, d_i, d_i, 1]^T$.
$I_i = [I_{i1}, \cdots, I_{iN}]^T$ and $d_i = [d_{i1}, \cdots, d_{iN}]^T$
When there is a corresponding codeword,
the corresponding codeword $c_i^l$ is updated as follows.
$\bar{P}_i \leftarrow \left(\dfrac{f\bar{P}_i + P_i}{f+1}\right)$, $AUX_i \leftarrow [\min_i(I_i, I_{imin}), \max_i(I_i, I_{imax}), \min_i(d_i, d_{imin}),$
$\max_i(d_i, d_{imax}), f+1]^T$.
Step 4: Step 2 is repeated in the next frame.

FIG. 3

Algorithm 2 Temporal background information estimation

Step 1: For $P_i$, an optimally corresponding codeword is found in
a background codebook ($CB^i_{aa}$) satisfying the following conditions.
(a) $T1_b$ = colordistortion($p_a, \bar{p}^b_a$),
(b) $T2_b$ = brightness($I_a, AUX^b_i$),
(c) $T3_b$ = disparity($d, AUX^b_i$), (d) $T^b_i = \begin{cases} 1 & \text{if } ((T1_b \leq e_a) \wedge T2_b \wedge T3_b) = 1 \\ 0 & \text{otherwise} \end{cases}$ where $e_i < e_1$ (e) $T_i = \prod_{j=1}^{L^b_i} T_b$.

Step 2: When $T_i = 1$, $P_i$ is regarded as a background patch,
temporal background information is determined as follows.
$C^t_{bg}(i) = C_i$, $D^t_{bg}(i) = D_i$
$C_i$ and $D_i$ are color and depth elements of $P_i$, respectively.
When $T_i \neq 1$, the following process is performed.
(a) $T4^b_i$ = disparity($d^b_i, AUX^b_i$), (b) $T4_i = \prod_{j=1}^{L^b_i} T4^b_i$, where $d^b_i \in D^b_{bg}$ Step 3: When $T4^b_i = 1$, temporal background information of
a current frame of a $P_i$ region is replaced with temporal background
information of a preceding frame.
   $C^t_{bg}(i) = C^{t-1}_{bg}(i)$, $D^t_{bg}(i) = D^{t-1}_{bg}(i)$.
When $T4^b_i \neq 1$, $P_i$ is regarded as a foreground patch,
and temporal background information corresponding to
$P_i$ is set as a 0-vector.
   $C^t_{bg}(i) = [0,\cdots,0]^T$, $D^t_{bg}(i) = [0,\cdots,0]^T$.

FIG. 4

---
Algorithm 3 Segmentation and labeling
---
Step 1: For an input image IM having a size of X*Y,
a labeling order is set as k=0, and a pixel position of IM is set as $z_c = 0$
Step 2: k=k+1, $z_c=z_c+1$.
Step 3: A queue in which a pixel position of a kth labeled set is stored
and a temporary queue are initialized as follows.
$\phi_k=\phi$, $Z=\phi$
Step 4: When $z_c$ is the last position of IM, move to step 9,
change $z_c$ to $z_c=z_c+1$, and repeat step 4.
Step 5: Store $z_c$ in the temporary queue as $Z \leftarrow z_c$
Step 6: Withdraw the last element of the temporary queue like $Z \rightarrow z_i$
$\phi_k \leftarrow z_i$, $IM(z_i)=0$.
Step 7: Check 8 pixels near $IM(z_i)$ as follows.
$IM(z_i+1) \neq 0$, $Z \leftarrow (z_i+1)$.
$IM(z_i-1) \neq 0$, $Z \leftarrow (z_i-1)$.
$IM(z_i+Y) \neq 0$, $Z \leftarrow (z_i+Y)$.
$IM(z_i-Y) \neq 0$, $Z \leftarrow (z_i-Y)$.
$IM(z_i+Y+1) \neq 0$, $Z \leftarrow (z_i+Y+1)$.
$IM(z_i+Y-1) \neq 0$, $Z \leftarrow (z_i+Y-1)$.
$IM(z_i-Y+1) \neq 0$, $Z \leftarrow (z_i-Y+1)$.
$IM(z_i-Y-1) \neq 0$, $Z \leftarrow (z_i-Y-1)$.
Repeat step 6 until $Z=\phi$.
Step 8: $\phi \leftarrow \phi_k$, repeat step 2 until all pixels of IM are checked.
Step 9: Return $\phi$.
---

FIG. 7

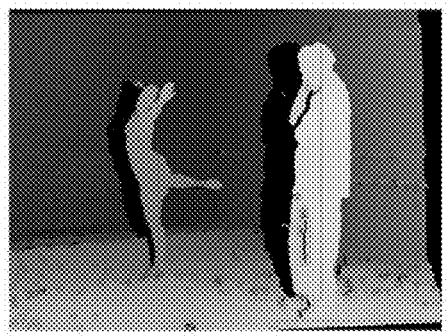 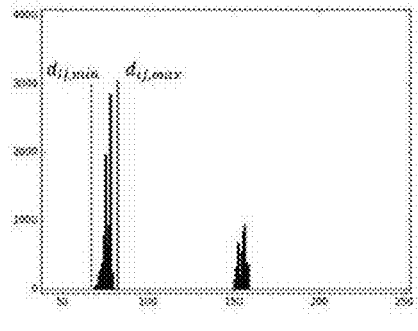
(a) (b)
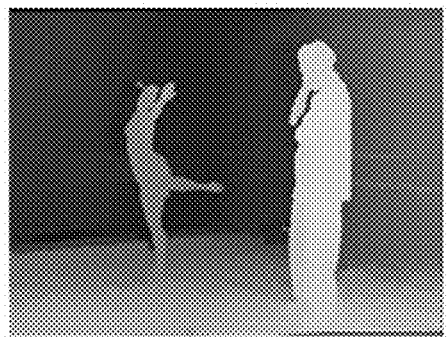 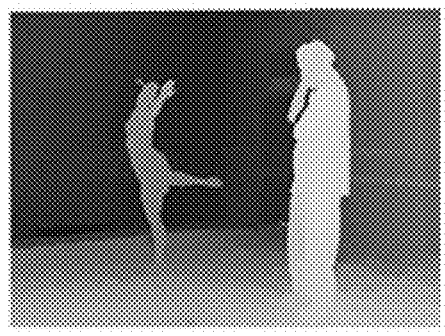
(c) (d)
FIG. 10
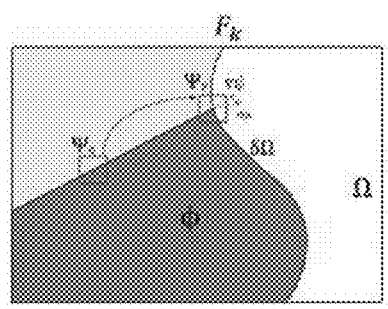 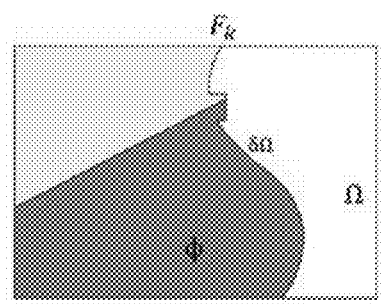
(a) (b)
FIG. 11

HOME FILLING METHOD USING ESTIMATED SPATIO-TEMPORAL BACKGROUND INFORMATION, AND RECORDING MEDIUM AND APPARATUS FOR PERFORMING THE SAME

CROSS-REFERENCE TO RELATED APPLICATION

This application claims priority to and the benefit of Korean Patent Application No. 10-2017-0072427, filed on Jun. 9, 2017, the disclosure of which is incorporated herein by reference in its entirety.

BACKGROUND

The present disclosure relates to a hole filling method using estimated spatio-temporal background information, and a recording medium and apparatus for performing the same.

Due to industrial and academic development of the three-dimensional (3D) video field, much research has been conducted on various systems and display devices that provide 3D content. Additionally, further research has also been conducted regarding system and display devises that enable a user to experience virtual reality without equipment, such as 3D glasses.

For this, a method of composing a virtual-viewpoint image through depth-image-based rendering, in which a virtual-viewpoint image is composed using actual viewpoint images, has been proposed to provide a free viewpoint. Depth-image-based rendering uses 3D warping, and thus holes are created in the virtual-viewpoint image. In this case, a small hole is created due to an estimation error of a depth value, while a large hole is created by a region exposed in an actual viewpoint image being hidden in a virtual-viewpoint image.

An interpolation method and an in-painting method have been proposed as representative methods of filling such holes.

However, according to the interpolation method, geometric distortion and blurring occur along a boundary between a background region and a foreground region, and the blurring becomes more severe as the hole region increases in size.

On the other hand, the in-painting method is utilized to fill holes by using characteristics of an unknown region and a neighboring known region in images sharing similar statistical properties or geometric structures.

It has been found that the in-painting method is capable of effectively filling holes in combination with depth information for distinguishing a background region and a foreground region. However, the in-painting method has a limitation with respect to hole filling performance when there is restricted information regarding a background region and a foreground region in a hidden region.

Therefore, in order to create a satisfactory composite image from a virtual viewpoint, accuracy of separation between a background region and a foreground region in a hidden region is very important.

Various studies have been conducted on performing a hole filling process using temporal information to separate a foreground region and a background region in a hidden region.

For example, a method of determining a global threshold by using a background sprite of a depth image and separating a background region and a foreground region by using the global threshold has been proposed.

The method includes passively selecting a hole filling action for the separated foreground region and background region and applying an in-painting action thereto, and thus has a large variation in hole filling performance depending on an in-painting order.

As another example, a method of estimating global movement between consecutive frames in a group of pictures (GOP) and determining an in-painting order thereof by using updated temporal information has been proposed.

The method generates a frame delay because a display order and a hole filling order thereof are different, and generates a serious geometric distortion when movements of objects present in a frame are different.

Also, recent methods of estimating consistent temporal background information and applying the estimated temporal background information to a hole filling process have been proposed to enhance accuracy of separation of background and foreground regions.

As an example, a method of estimating a background region between consecutive virtual viewpoint images by using depth-image-based structural similarity and utilizing background information in the in-painting process has been proposed.

As another example, a Gaussian mixture model has been proposed for estimating a background sprite in a depth image.

The methods have limitations in estimating background regions present in preceding images, and thus also have a problem of there being a limitation in using in-painting to generate a satisfactory virtual viewpoint image.

Accordingly, spatio-temporal information also needs to be considered to enhance accuracy of background information.

Similarity between textures, depth images, frames, or the like is used to estimate temporal background information.

A codebook is utilized to detect codewords corresponding to texture and depth information to estimate temporal similarity information.

However, the codebook has limitations in effectively and quickly estimating background pixels present in a preceding image because a fixed threshold value is used to select a codeword corresponding to background information.

SUMMARY OF THE DISCLOSURE

The present disclosure is designed to solve the above problems, and is directed to providing a hole filling method using estimated spatio-temporal background information, the hole filling method being capable of estimating temporal background information, estimating spatial background information, and merging the temporal background information and the spatial background information to perform a hole filling process, as well as a recording medium and apparatus for performing the same.

The present disclosure is also directed to providing a hole filling method using estimated spatio-temporal background information, the hole filling method being capable of estimating temporal background information by using a background codebook based on a non-overlapping patch, and a recording medium and apparatus for performing the same.

The present disclosure is also directed to providing a hole filling method using estimated spatio-temporal background information and capable of removing a ghost from a 3D warped image through a depth-image-based adaptive filter method, and a recording medium and apparatus for performing the same.

The present disclosure is also directed to providing a hole filling method using estimated spatio-temporal background information and capable of filling remaining holes through an in-painting action using a priority function including a depth term, and a recording medium and apparatus for performing the same.

According to an aspect of the present disclosure, there is a hole filling method using estimated spatio-temporal background information, the hole filling method including a temporal background information estimation step of extracting a background codebook for each non-overlapping patch by using a color image and depth image for each frame of an input image, and estimating a temporal-background-color image and a temporal-background-depth image by using the extracted background codebook; a 3D warping step of performing a 3D warping action on the color image and depth image to acquire a color image of a virtual viewpoint and a depth image of the virtual viewpoint and performing a 3D warping action on the temporal-background-color image and the temporal-background-depth image to acquire a temporal-background-color image and temporal-background-depth image of the virtual viewpoint; a ghost removal step of removing a ghost phenomenon from the color image of the virtual viewpoint and the depth image of the virtual viewpoint and removing a ghost phenomenon from the temporal-background-color image and temporal-background-depth image of the virtual viewpoint; a spatial background information estimation step of estimating spatial background information in each hidden region of the depth image of the virtual viewpoint from which ghost phenomenon is removed; a primary hole filling step of acquiring a spatio-temporal-background-color image and a spatio-temporal-background-depth image of the virtual viewpoint by using similarity between the temporal-background-depth image of the virtual viewpoint and spatial-background-depth images of the virtual viewpoint to perform a primary hole filling action; and a secondary hole filling step of performing an in-painting action based on a priority function including a depth term to perform a hole filling action on remaining holes.

The temporal background information estimation step may include generating a codebook for each of the non-overlapping patches by using the color image and depth image per each of the frames of the input image; separating the background codebook from the generated codebook; and estimating temporal background information by using the separated background codebook.

The ghost removal step may include obtaining a binary image from the color image or depth image of the virtual viewpoint; generating a boundary mask by using the binary image; labeling each hidden boundary region by using the boundary mask and obtaining position information of boundary pixels of a foreground region and a background region; defining a rectangle including each of the labeled hidden boundary regions; subdividing the rectangle into non-overlapping child rectangles; dividing depth information of each of the child rectangles into a low-depth cluster and a high-depth cluster; and removing a ghost phenomenon from a background boundary region of each of the child rectangles by using a minimum depth value of the high-depth cluster as a threshold value.

The spatial background information estimation step may include obtaining a binary mask from the depth image of the virtual viewpoint from which the ghost phenomenon is removed; labeling each of the hidden regions by using the binary mask and obtaining position information of each of the hidden regions; defining a rectangle including each labeled hidden region; subdividing the rectangle into non-overlapping child rectangles; dividing depth information of each of the child rectangles into a low-depth cluster and a high-depth cluster; and estimating a lower limit and an upper limit of the spatial-background-depth images of the virtual viewpoint by using minimum and maximum values of depth information of the low-depth cluster.

The primary hole filling operation may include comparing the similarity between the temporal-background-depth image of the virtual viewpoint and the spatial-background-depth images of the virtual viewpoint, updating the spatio-temporal-background-depth image of the virtual viewpoint with the temporal-background-depth image of the virtual viewpoint when the temporal-background-depth image of the virtual viewpoint is between a lower limit and an upper limit of the spatial-background-depth images, and otherwise updating the spatio-temporal-background-depth image of the virtual viewpoint with the depth image of the virtual viewpoint from which the ghost phenomenon is removed; and comparing the similarity between the temporal-background-depth image of the virtual viewpoint and the spatial-background-depth images of the virtual viewpoint, updating the spatio-temporal-background-color image of the virtual viewpoint with the temporal-background-color image of the virtual viewpoint when the temporal-background-depth image of the virtual viewpoint is between the lower limit and the upper limit of the spatial-background-depth images, and otherwise updating the spatio-temporal-background-color image of the virtual viewpoint with the color image of the virtual viewpoint from which the ghost phenomenon is removed.

The secondary hole filling operation may include setting a non-overlapping patch centering on each hidden boundary region pixel of a spatio-temporal color image of the virtual viewpoint; determining a priority of each non-overlapping patch by using a priority function including a reliability term, a data term, and a depth term; and performing an in-painting action on each of the hidden boundary region pixels according to the determined priority to perform a hole filling action on the remaining holes.

According to an aspect of the present disclosure, there is a hole filling apparatus using estimated spatio-temporal background information, where the hole filling apparatus includes a temporal background information estimation unit configured to extract a background codebook for each non-overlapping patch by using a color image and depth image for each frame of an input image, and estimate a temporal-background-color image and a temporal-background-depth image by using the extracted background codebook; a 3D warping unit configured to perform a 3D warping action on the color image and depth image to acquire a color image of a virtual viewpoint and a depth image of the virtual viewpoint and perform a 3D warping action on the temporal-background-color image and the temporal-background-depth image to acquire a temporal-background-color image and temporal-background-depth image of the virtual viewpoint; a ghost removal unit configured to remove a ghost phenomenon from the color image of the virtual viewpoint and the depth image of the virtual viewpoint and remove a ghost phenomenon from the temporal-background-color image and temporal-background-depth image of the virtual viewpoint; a spatial background information estimation unit configured to estimate spatial background information in each hidden region of the depth image of the virtual viewpoint from which ghost phenomenon is removed; a primary hole filling unit configured to acquire a spatio-temporal-background-color image and a spatio-temporal-background-depth image of the virtual viewpoint by using similarity between the temporal-background-depth image of the virtual viewpoint and spatial-background-depth images of the virtual viewpoint to perform a primary hole filling action; and a secondary hole filling unit configured to perform an in-painting action based on a priority function including a depth term to perform a hole filling action on remaining holes.

The temporal background information estimation unit may include a codebook generation unit configured to generate a codebook for each of the non-overlapping patches by using the color image and depth image per each of the frames of the input image; a background codebook separation unit configured to separate the background codebook from the generated codebook; and an estimation unit configured to estimate temporal background information using the separated background codebook.

The ghost removal unit may obtain a binary image from the color image or depth image of the virtual viewpoint, generate a boundary mask using the binary image, label each hidden boundary region by using the boundary mask and obtain position information of boundary pixels of a foreground region and a background region, define a rectangle including each of the labeled hidden boundary regions, subdivide the rectangle into non-overlapping child rectangles, divide depth information of each of the child rectangles into a low-depth cluster and a high-depth cluster, and remove a ghost phenomenon from a background boundary region of each of the child rectangles by using a minimum depth value of the high-depth cluster as a threshold value.

The spatial background information estimation unit may obtain a binary mask from the depth image of the virtual viewpoint from which the ghost phenomenon is removed, label each of the hidden regions by using the binary mask and obtain position information of each of the hidden regions, define a rectangle including each of the labeled hidden regions, subdivide the rectangle into non-overlapping child rectangles, divide depth information of each of the child rectangles into a low-depth cluster and a high-depth cluster, and estimate a lower limit and an upper limit of the spatial-background-depth images of the virtual viewpoint using minimum and maximum values of depth information of the low-depth cluster.

The primary hole filling unit may compare the similarity between the temporal-background-depth image of the virtual viewpoint and the spatial-background-depth images of the virtual viewpoint, update the spatio-temporal-background-depth image of the virtual viewpoint with the temporal-background-depth image of the virtual viewpoint when the temporal-background-depth image of the virtual viewpoint is between a lower limit and an upper limit of the spatial-background-depth images, and otherwise update the spatio-temporal-background-depth image of the virtual viewpoint with the depth image of the virtual viewpoint from which ghost phenomenon is removed; and may compare the similarity between the temporal-background-depth image of the virtual viewpoint and the spatial-background-depth images of the virtual viewpoint, update the spatio-temporal-background-color image of the virtual viewpoint with the temporal-background-color image of the virtual viewpoint when the temporal-background-depth image of the virtual viewpoint is between the lower limit and the upper limit of the spatial-background-depth images, and otherwise update the spatio-temporal-background-color image of the virtual viewpoint with the color image of the virtual viewpoint from which the ghost phenomenon is removed.

The secondary hole filling unit may set a non-overlapping patch centering on each hidden boundary region pixel of a spatio-temporal color image of the virtual viewpoint, determine a priority of each of the non-overlapping patches by using a priority function including a reliability term, a data term, and a depth term, and perform an in-painting action on each of the hidden boundary region pixels according to the determined priority to perform a hole filling action on the remaining holes.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a diagram schematically illustrating a configuration of a background information estimation unit of FIG. 1;

FIG. 3 shows an algorithm used by a codebook generation unit of FIG. 2 to generate a codebook for each non-overlapping patch Pi;

FIG. 4 shows an algorithm used by an estimation unit of FIG. 2 to estimate temporal background information;

FIG. 7 shows an algorithm used by the ghost removal unit of FIG. 1 to label each hidden region;

FIG. 10 is a diagram illustrating a process of a spatial background information estimation unit of FIG. 1 estimating a local background depth value;

FIG. 11 is a diagram illustrating a process of a secondary hole filling unit of FIG. 1 performing a secondary hole filling action.

DETAILED DESCRIPTION OF EXEMPLARY EMBODIMENTS

Figure 1:
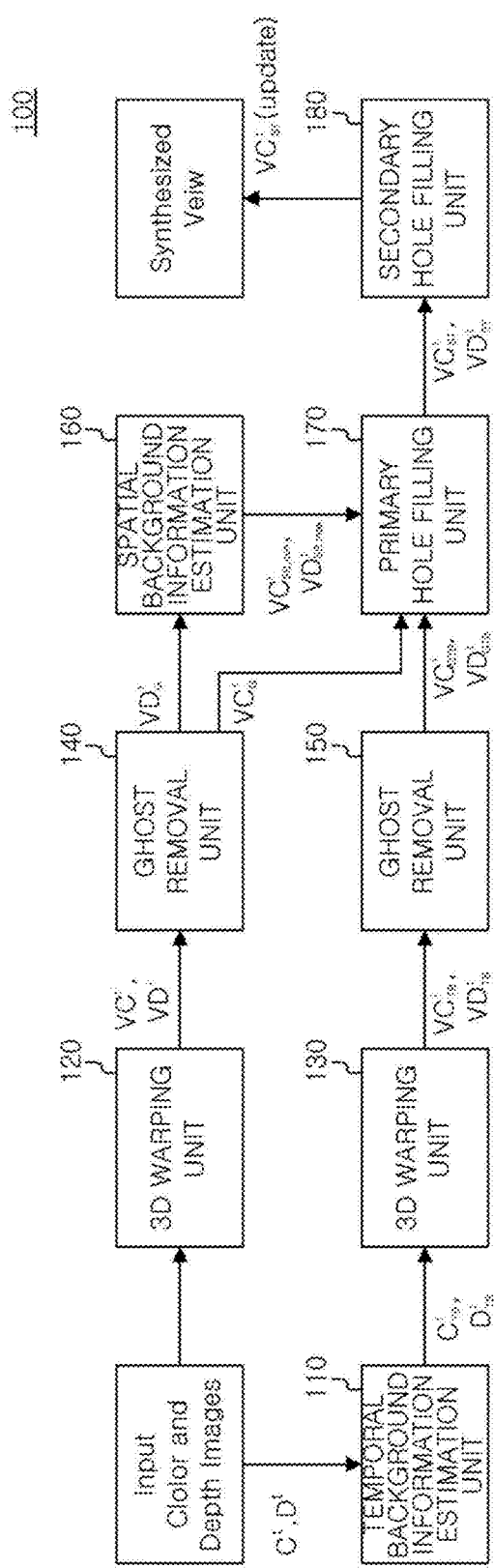
FIG. 1 is a diagram schematically illustrating a configuration of a hole filling apparatus using estimated spatio-temporal background information according to an embodiment of the present disclosure.

The following detailed description refers to the accompanying drawings that illustrate example embodiments consistent with the present disclosure. These embodiments will be described in sufficient detail to enable those skilled in the art to practice the present disclosure. It should be understood that the various embodiments of the present disclosure, although different, are not necessarily mutually exclusive. For example, a particular feature, structure, or characteristic described herein in connection with one embodiment, may be implemented within other embodiments without departing from the spirit and scope of the present disclosure. In addition, it should be understood that positions or arrangements of individual elements within each disclosed embodiment may be modified without departing from the spirit and scope of the present disclosure. The following detailed description is, therefore, not to be taken in a limiting sense, and the scope of the present disclosure is defined only by appropriately interpreting the appended claims along with the full range of equivalents to which the claims are entitled. In the drawings, like numerals refer to the same or similar elements throughout several views.

A hole filling method using estimated spatio-temporal background information and a recording medium and apparatus for performing the same according to an embodiment of the present disclosure will be described below in detail with reference to the accompanying drawings.

FIG. 1 is a diagram schematically illustrating a configuration of a hole filling apparatus using estimated spatio-temporal background information according to an embodiment of the present disclosure.

As shown in FIG. 1, a hole filling apparatus 100 according to an embodiment of the present disclosure may include a temporal background information estimation unit 110, 3D warping units 120 and 130, ghost removal units 140 and 150, a spatial background information estimation unit 160, a primary hole filling unit 170, and a secondary hole filling unit 180.

The term unit is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

The hole filling apparatus 100 according to an embodiment of the present disclosure may receive a color image $C^t$ for each frame and a depth image $D^t$ including depth map information corresponding to the color image $C^t$ as input images.

Since there is a temporal correlation between consecutive frames, a portion of a hidden region in a current virtual viewpoint image may be present in preceding virtual viewpoint images. Since a hole region has many background regions, there is a need to estimate background information from preceding frames and use the estimated background information to fill a background region of a current frame.

Thus, the temporal background information estimation unit 110 extracts a background codebook for each non-overlapping patch by using a color image and depth image for each frame of the input image and estimates a temporal-background-color image and a temporal-background-depth image by using the extracted background codebook.

FIG. 2 is a schematic diagram showing a configuration of the temporal background information estimation unit 110 of FIG. 1, and the temporal background information estimation unit 110 may include a codebook generation unit 113, a background codebook separation unit 115, and an estimation unit 117.

The codebook generation unit 113 generates a codebook for each non-overlapping patch by using a color image and depth image for each frame of an input image.

When a frame composed of a color image and a depth image with a size of X×Y, is divided into non-overlapping patches with a size of U×U, an $i^{th}$ non-overlapping patch vector may be expressed as $P_i=[p_{i1}, p_{i2}, \ldots, p_{iU^2}]^T$, and a RGBD vector of a $j^{th}$ pixel of $P_i$ may be expressed as $P_{ij}=[r_{ij}, g_{ij}, b_{ij}, d_{ij}]^T$. Also, luminance of $P_{ij}$ may be defined as $I_{ij}=\sqrt{r_{ij}^2+g_{ij}^2+b_{ij}^2}$.

The patch $P_i$ composed of L codewords may be expressed as $CB_i^t=\{c_i^1, c_i^2, \ldots, c_i^L\}$. Each of the codewords may be composed of $\overline{P}_i^l=[\overline{p}_{i1}^l, \overline{p}_{i2}^l, \ldots, \overline{p}_{iU^2}^l]^T$ including an RGBD component and $AUX_i^l=[I_{i,min}^l, I_{i,max}^l, d_{i,min}^l, d_{i,max}^l, f_i^l]^T$ including 5 elements. A $j^{th}$ element of $\overline{p}_{ij}^l=[\overline{r}_{ij}^l, \overline{g}_{ij}^l, \overline{b}_{ij}^l, \overline{d}_{ij}^l]^T$ in an $l^{th}$ codeword $\overline{P}_i^l$ denotes an RGBD vector composed of an average color component and an average depth. In $AUX_i^l$, $I_{i,min}^l$ denotes a minimum luminance vector, $I_{i,max}^l$ denotes a maximum luminance vector, $d_{i,min}^l$ denotes a minimum depth vector, $d_{i,max}^l$ denotes a maximum depth vector, and $f_i^l$ denotes a codeword occurrence frequency. Each vector of $AUX_i^l$ may be expressed as follows:

$$I_{i,min}^l=[I_{i1,min}^l, I_{i2,min}^l, \ldots, I_{iU^2,min}^l]^T,$$

$$I_{i,max}^l=[I_{i1,max}^l, I_{i2,max}^l, \ldots, I_{iU^2,max}^l]^T,$$

$$d_{i,min}^l=[d_{i1,min}^l, d_{i2,min}^l, \ldots, d_{iU^2,min}^l]^T,$$

$$d_{i,max}^l=[d_{i1,max}^l, d_{i2,max}^l, \ldots, d_{iU^2,max}^l]^T,$$

As described above, the codebook generation unit 113 may generate a codebook of each non-overlapping patch $P_i$ by using an algorithm of FIG. 3 according to a defined codebook configuration.

That is, the codebook generation unit 113 finds a codeword $c_i^l$ corresponding to a non-overlapping patch $P_i$ of a current frame from a codebook of the non-overlapping patch $P_i$ by using a color distortion function, a luminance similarity function, and a depth similarity function for the non-overlapping patch $P_i$.

Here, the color distortion function may be used to compare similarity between color components composing $P_i$ and $c_i^l$ and may be defined as the following Equation 1 below:

$$colordistortion(p_{ij}, \overline{p}_{ij}^l) = \sqrt{\|p_{ij}\|^2 - h^2}, \quad \text{[Equation 1]}$$

$$h^2 = \|p_{ij}\|^2 \cos^2\theta = \frac{\langle p_{ij}, \overline{p}_{ij}^l \rangle}{\|\overline{p}_{ij}^l\|^2},$$

where $1 \le j \le U^2$, $\|\cap\|$ is an $l_2$ norm, and $\langle p_{ij}, \overline{p}_{ij}^l \rangle$ is an inner product of $p_{ij}$ and $\overline{p}_{ij}^l$.

Also, in order to reflect a change in luminance between frames, a luminance similarity function between $P_i$ and $c_i^l$ may be defined by Equation 2 below:

$$brightness(I_{ij}, AUX_i^l) = \begin{cases} 1 & \text{if } I_{low} \le I_{ij} \le I_{hi} \\ 0 & \text{otherwise} \end{cases} \quad \text{[Equation 2]}$$

$$I_{hi} = \min\left(\beta \times I_{ij,max}^l, \frac{I_{ij,min}^l}{\alpha}\right),$$

where $0<\alpha<1$ and $\beta>1$ ($\alpha$ and $\beta$ are constants). Since the change in luminance between frames affects a depth image, a depth similarity function may be defined by Equation 3 below:

$$disparity(d_{ij}, AUX_i^l) = \begin{cases} 1 & \text{if } d_{low} \le d_{ij} \le d_{hi} \\ 0 & \text{otherwise} \end{cases} \quad \text{[Equation 3]}$$

$$d_{low} = \alpha d_{ij,max}^l, d_{hi} = \min\left(\beta \times d_{ij,max}^l, \frac{d_{ij,min}^l}{\alpha}\right).$$

A criterion for finding a $j^{th}$ component of the codeword $c_i^t$ corresponding to the $j^{th}$ pixel of $P_i$ by using the above-described similarity functions may be defined by Equation 4 below:

$$T_{ij}^t = \begin{cases} 1 & \text{if } ((T1_{ij}^t \leq \epsilon_1) \wedge T2_{ij}^t \wedge T3_{ij}^t) = 1 \\ 0 & \text{otherwise} \end{cases} \quad \text{[Equation 4]}$$

where $\wedge$ is a Boolean AND operation, and $\in_1$ is a positive threshold.

As described above, when the codeword $c_i^t$ corresponding to the non-overlapping patch $P_i$ of the current frame is not found in a codebook of non-overlapping patches $P_i$ by using the color distortion function, the luminance similarity function, and the depth similarity function with respect to each of the non-overlapping patches $P_i$, a codeword of the overlapping patch $P_i$ of the current frame is added to the codebook of the non-overlapping patches $P_i$. On the other hand, when the corresponding codeword is found, an occurrence frequency of the corresponding codeword is increased by one.

In step 3 of the algorithm of FIG. 3, ← denotes an operator used to add one codeword to the end of a queue. Also, $\min_v(a,b)$ and $\max_v(a,b)$ denote a minimum operator and a maximum operator in units of elements of vector a and a vector b, respectively. For example, $\min_v(a,b)$ of the vector a and the vector b with a size of $U^2$ may be defined by Equation 5 below:

$$\min_v(a,b) = \{\min(a_1,b_1), \ldots, \min(a_{U^2}, b_{U^2})\}. \quad \text{[Equation 5]}$$

As described above, when the codebook generation unit 113 generates a codebook for each patch of a current frame through the algorithm of FIG. 3, the background codebook separation unit 115 may apply a k-means clustering method (k=2) to an average depth value of codewords constituting the codebook for each of the patches by using a characteristic of a depth value of a background region being less than a depth value of a foreground region and may separate a background codebook therefrom as follows. An average depth value of an $i^{th}$ codeword of the codebook $CB_i^t$ of the patch $P_i$ may be determined using Equation 6:

$$\bar{d}_i^t = U^{-2} \sum_{j=1}^{U^2} \bar{d}_{ij}^t \text{ for } 1 \leq l \leq L. \quad \text{[Equation 6]}$$

The background codebook may be determined with respect to two codebooks $CB_{i1}^t = \{c_i^m | 1 \leq m \leq M\}$ and $CB_{i2}^t = \{c_i^m | M+1 \leq m \leq L\}$ separated through a clustering process using Equation 7 below:

$$CB_{i,BG}^t = \begin{cases} CB_{i1}^t & \text{if } \max_{1 \leq m \leq M} \bar{d}_i^m \leq \max_{M+1 \leq m \leq L} \bar{d}_i^m \\ CB_{i2}^t & \text{otherwise} \end{cases} \quad \text{[Equation 7]}$$

In Equation 4, as a threshold value $\in_1$ is set to be small, a code search condition of $CB_i^t$ becomes strict. Thus, a patch in which a luminance component is finely changed may be determined to be a foreground patch. Also, frequently, static patches that are momentarily present in preceding frames may not be present in the background codebook. Therefore, there is a need to re-discover whether a patch may become a candidate of a background region by applying a loose threshold value, and there is also a need to determine a static foreground region momentarily present in the preceding frames.

Thus, when the background codebook is determined through the background codebook separation unit 115, the estimation unit 117 estimates temporal background information of the current frame from the background codebook by using the algorithm of FIG. 4.

That is, the estimation unit 117 finds the codeword corresponding to the non-overlapping patch $P_i$ of the current frame from the background codebook of the non-overlapping patch $P_i$ separated by the background codebook separation unit 115 with respect to each of the non-overlapping patches $P_i$.

As a result, when the codeword corresponding to the non-overlapping patch $P_i$ of the current frame is present in the background codebook of the non-overlapping patch $P_i$, the estimation unit 117 regards the non-overlapping patch $P_i$ as a background patch and determines that a color image and a depth image of the non-overlapping patch $P_i$ of the current frame are temporal background information of the non-overlapping patch $P_i$ of the current frame.

Also, when there is no corresponding codeword, the estimation unit 117 calculates similarity of the non-overlapping patch $P_i$ with temporal background depth information of the preceding frame. When the similarity is high, that is, $T4_i^m = 1$, the estimation unit 117 regards the non-overlapping patch $P_i$ as corresponding to the background information of the preceding frame and replaces the temporal background information of the current frame of the non-overlapping patch $P_i$ with the temporal background information of the preceding frame. When the similarity is low, that is, $T4_i^m \neq 1$, the estimation unit 117 regards the non-overlapping patch $P_i$ as a foreground patch and sets the temporal background information corresponding to the non-overlapping patch $P_i$ as a 0-vector.

Figure 5:
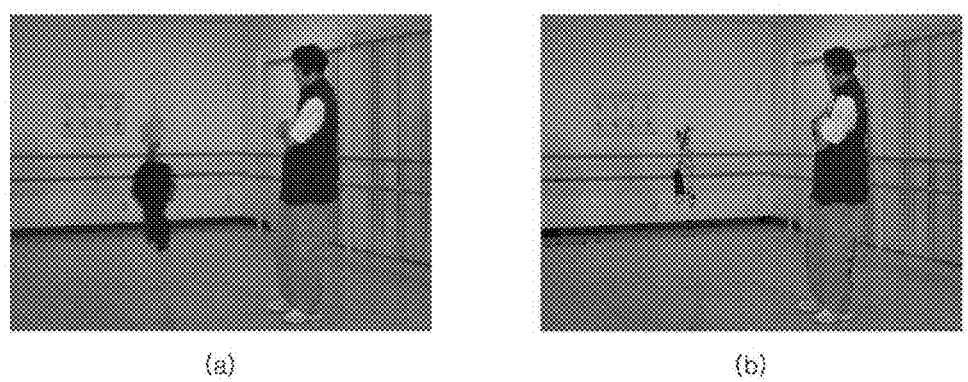
FIG. 5 is a diagram showing a performance comparison of pieces of estimated temporal background information according to the present disclosure.

FIG. 5 is a diagram showing a performance comparison of pieces of estimated temporal background information according to the present disclosure. A pre-existing codebook method has limitations in estimating background information because a static foreground region momentarily present in a preceding frame is not accommodated in the codebook, as shown in FIG. 5A. However, with respect to the estimated temporal background information according to the present disclosure, it can be seen that the temporal background information may be effectively estimated by reflecting the background region and the static foreground region in the background codebook, as shown in the result of FIG. 5B. A black portion in FIG. 5B represents pixels determined to be the temporal foreground region. Through this result, it can be seen that background information and static foreground information may be effectively collected by using a texture-depth-adaptive patch-based background codebook method.

The 3D warping unit 120 performs 3D warping on the color image $C^t$ and the depth image $D^t$ that are received by the hole filling apparatus 100 as the input images to acquire a color image and a depth image of a virtual viewpoint.

The 3D warping unit 130 performs 3D warping on the temporal background color and depth image estimated by the temporal background information estimation unit 110 to acquire a temporal-background-color image and temporal-background-depth image of the virtual viewpoint.

The ghost removal unit 140 removes a ghost phenomenon from the color image of the virtual viewpoint and the depth image of the virtual viewpoint that are acquired by the 3D warping unit 120, and the ghost removal unit 150 removes a ghost phenomenon from the temporal-background-color image and temporal-background-depth image of the virtual viewpoint that are acquired by the 3D warping unit 130.

In detail, since a depth image has a relatively lower resolution than a color image, there may be inconsistency between pixels of a depth image and a color image in a 3D warped image, and thus pixels in a foreground region may be present in a background region. Such a ghost phenomenon causes visual inconvenience and also causes maintenance of temporal consistency between synthesized virtual viewpoint images to fail. Accordingly, according to the present disclosure, it is possible to remove only the ghost phenomenon present in the background region while maintaining a geometric structure of foreground pixels.

First, a process of removing a ghost phenomenon from a color image and a depth image of a virtual viewpoint will be described.

The ghost removal unit 140 may define a binary image for the color image or depth image of the virtual viewpoint in order to separate a background and a foreground in a hidden region to form a boundary between the background and the foreground, as shown in Equation 8 below:

$$BI(\hat{m}) = \begin{cases} 0 & \text{if } VD^t(\hat{m}) = \text{'hole'} \\ 1 & \text{otherwise} \end{cases}, \quad \text{[Equation 8]}$$

where $\hat{m}$ is a pixel position in a 2D image acquisition system.

Figure 6:
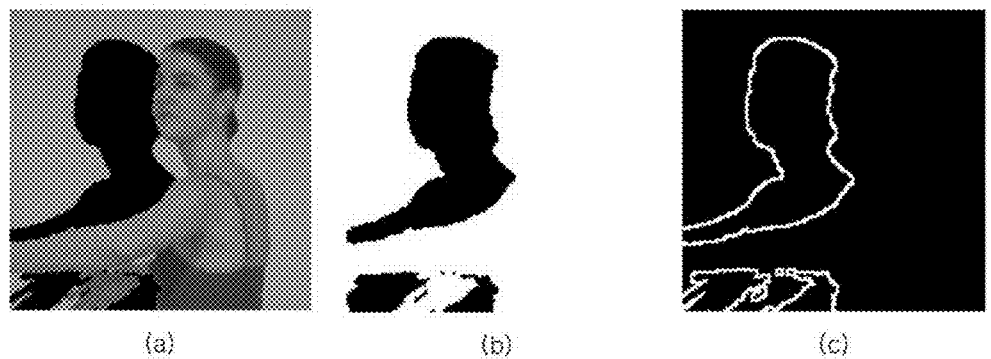
FIG. 6 is a diagram illustrating a process of a ghost removal unit of FIG. 1 removing a ghost phenomenon.

FIG. 6A shows an example of a color image of a virtual viewpoint, and FIG. 6B shows a binary image of the color image of FIG. 6A. The ghost removal unit 140 may apply a 2D Laplacian operator to the binary image to generate a boundary mask BM, as shown in FIG. 6C.

The ghost removal unit 140 may apply a flood-fill method, which is described in the algorithm of FIG. 7, to the boundary mask BM to label each hidden boundary region, and position information of boundary pixels in the foreground region and the background region may be determined using Equation 9 below:

$$\emptyset = \text{Algorithm3(BM)}. \quad \text{[Equation 9]}$$

The position information of the boundary pixels is applied to the depth image of the virtual viewpoint to separate the depth image into foreground and background boundary pixels as follows.

Figure 8:
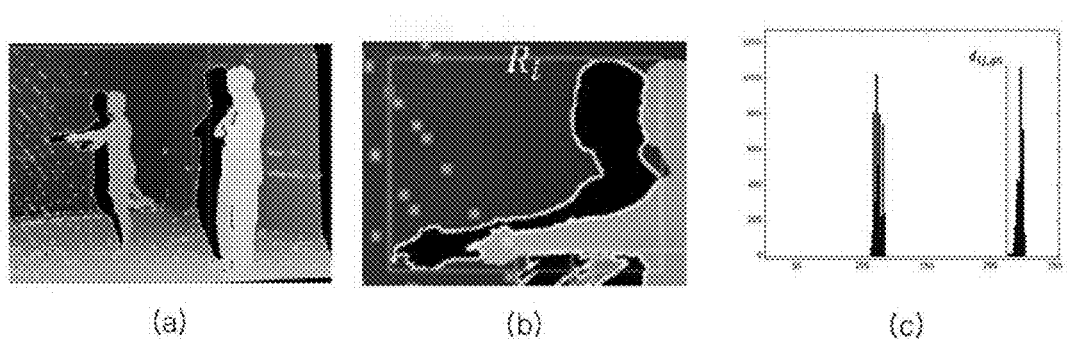
FIG. 8 shows an example of a result of the ghost removal unit of FIG. 1 labeling each hidden region.

First, as shown in FIG. 8A, a minimum rectangle (represented in red) including a hidden boundary region labeled (represented in yellow) is defined. Also, as shown in FIG. 8B, a rectangle $R_i$ with a size of M×N including an $i^{th}$ labeled region $\emptyset_i$ is divided into non-overlapping child rectangles, as shown in Equation 10 below:

$$R_i = \bigcup_{j=1}^{[\frac{N}{Z}]} CR_{ij} \quad \text{[Equation 10]}$$

where [N/Z] is the smallest integer equal to or greater than N/Z, and $CR_{ij}$ with a size of M×Z is a $j^{th}$ child rectangle of $R_i$. A k-means clustering method (k=2) may be applied to each of the child rectangles to divide depth information of the child rectangles into two clusters, as shown in Equation 11 below:

$$CR_{ij,low} \cup CR_{ij,hi} = CR_{ij},$$

$$CR_{ij,low} \cap CR_{ij,hi} = \emptyset, \quad \text{[Equation 11]}$$

where $CR_{ij,low}$ and $CR_{ij,hi}$ are a low-depth cluster and a high-depth cluster of each $CR_{ij}$, respectively. A threshold value for separating the foreground region and the background region may be set as a minimum depth value of the high-depth cluster, as shown in FIG. 8C.

The minimum depth value of the high-depth cluster may be defined by Equation 12 and may be used as a threshold value for removing a ghost phenomenon from a background boundary region of $CR_{ij}$.

$$d_{ij,gh} = \min_{\hat{n} \in CR_{ij,hi}} d(\hat{n}) \quad \text{[Equation 12]}$$

where $d_{ij,gh}$ may be used as a threshold value for removing the ghost phenomenon from the background boundary region in $CR_{ij}$, and the color image and the depth image of the virtual viewpoint from which the ghost phenomenon is removed may be determined using Equation 13 below:

$$VD_G^t(\hat{m}) = \begin{cases} VD^t & \text{if } VD^t(\hat{m}) \geq d_{ij,gh} \\ 0 & \text{otherwise} \end{cases}, \quad \text{[Equation 13]}$$

$$VC_G^t(\hat{m}) = \begin{cases} VC^t & \text{if } VD^t(\hat{m}) \geq d_{ij,gh} \\ 0 & \text{otherwise} \end{cases},$$

where $\hat{m} \in CR_{ij,hi}$ is a position of a 2D pixel, and the same criterion is applied to maintain consistency between the color image and the depth image.

Figure 9:
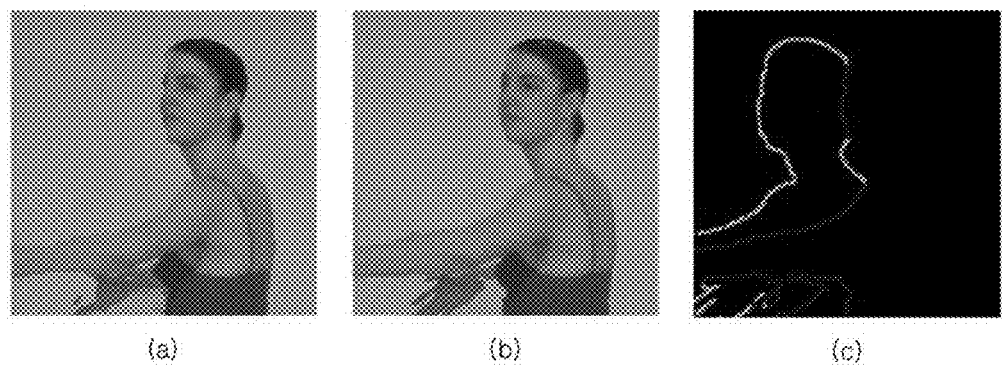
FIG. 9 is a diagram showing a performance comparison of ghost removal methods according to the present disclosure.

FIG. 9 is a diagram showing a performance comparison of ghost removal methods according to the present disclosure. FIG. 9A shows a composite image by using a pre-existing dilation method, FIG. 9B shows a composite image by using the ghost removal method of the present disclosure, and FIG. 9C is a diagram for comparing cases before and after the ghost phenomenon is removed using the ghost removal method of the present disclosure. In FIG. 9C, a green color represents removed background pixels and a blue color represents preserved foreground pixels.

According to the pre-existing dilation method, foreground and background pixels are simultaneously removed from a hidden region, and thus an object boundary surface component may be lost. On the other hand, the ghost removal method according to the present disclosure may check that the ghost phenomenon has been effectively removed from the background region while maintaining an object boundary.

As described above, the ghost removal unit 140 may remove the ghost phenomenon from the color image of the virtual viewpoint and the depth image of the virtual viewpoint through a series of processes.

Since the ghost removal unit 150 performs the same action as the ghost removal unit 140 to remove the ghost phenomenon from the temporal-background-color image and temporal-background-depth image of the virtual viewpoint, a detailed description thereof will be omitted.

The spatial background information estimation unit 160 estimates spatial background information in each hidden region of a virtual viewpoint depth image from which ghost phenomenon is removed by the ghost removal unit 140.

In detail, in order to identify spatial background regions in each of the hidden regions of the virtual viewpoint depth image $VD_G^t$ from which the ghost phenomenon is removed, a binary mask is defined by Equation 14 below:

$$BM_G(\hat{m}) = \begin{cases} 1 & \text{if } VD_G^t(\hat{m}) = \text{'hole'} \\ 0 & \text{otherwise} \end{cases} \quad \text{[Equation 14]}$$

Position information of each hidden region that is separated and labeled may be determined by applying the algorithm of FIG. 7 to a binary mask $BM_G$, as shown in Equation 15 below:

$$\Omega = \text{Algorithm3}(BM_G). \quad \text{[Equation 15]}$$

Through the algorithm of FIG. 7, labeling and position information of each of the hidden regions is determined, and a minimum rectangle including each of the labeled hidden regions (represented in red) is defined.

Each of the minimum rectangles is subdivided into child rectangles to estimate a local background depth value thereof. Depth information in a corresponding child rectangle may be divided into regions of a low-depth cluster $CR_{ij,low}$ and a high-depth cluster $CR_{ij,hi}$, as shown in FIG. 10B, by applying the k-means clustering method to $CR_{ij}$, which is a $j^{th}$ child rectangle of an $i^{th}$ labeled rectangle $R_i$. It is preferable for depth information of pixels other than holes in the child rectangle to be applied to utilize local information of the child rectangle in the k-means clustering method.

As described above, a maximum value and a minimum value of the depth information of the divided low-depth cluster may be utilized as constraint conditions for determining the background region in the hidden region and may be determined using Equation 16 below:

$$d_{ij,max} = \max_{\hat{n} \in CR_{ij,low}} d(\hat{n}),$$

$$d_{ij,min} = \min_{\hat{n} \in CR_{ij,low}} d(\hat{n}). \quad \text{[Equation 16]}$$

A lower limit and an upper limit of a spatial background depth image of the virtual view point that are estimated through the constraint conditions of Equation 16 may be determined using Equation 17:

$$VD^t_{SB,max}(\hat{m}) = \begin{cases} d_{ij,max} & \text{if } BM_G(\hat{m}) = 1 \\ VD^t_G(\hat{m}) & \text{otherwise} \end{cases},$$

$$VD^t_{SB,min}(\hat{m}) = \begin{cases} d_{ij,min} & \text{if } BM_G(\hat{m}) = 1 \\ VD^t_G(\hat{m}) & \text{otherwise} \end{cases}, \quad \text{[Equation 17]}$$

where $\hat{m} \in CR_{mn,low}$ is a position of a 2D pixel.

FIGS. 10C and 10D show result images indicating the lower limit and the upper limit of the spatial background depth information by using a local statistical characteristic of the depth information.

The primary hole filling unit 170 acquires a temporal-background-color image and temporal-background-depth image of the virtual viewpoint by using similarity between a temporal-background-depth image $VD_{GTB}^t$ of the virtual viewpoint received from the ghost removal unit 150 and spatial-background-depth images $VD_{SB,max}^t$ and $VD_{SB,min}^t$ of the virtual viewpoint received from the spatial background information estimation unit 160, and then performs a primary hole filling action.

Here, the spatio-temporal-background-depth image of the virtual viewpoint may be acquired through a process of comparing the similarity between the temporal-background-depth image $VD_{GTB}^t$ of the virtual viewpoint and the spatial-background-depth images $VD_{SB,max}^t$ and $VD_{SB,min}^t$ of the virtual viewpoint, updating the spatio-temporal-background-depth image $VD_{ST}^t$ of the virtual viewpoint with the temporal-background-depth image $VD_{GTB}^t$ of the virtual viewpoint when the temporal-background-depth image $VD_{GTB}^t$ of the virtual viewpoint is between a lower limit and an upper limit of the spatial-background-depth images of the virtual view point, and otherwise updating the spatio-temporal-background-depth image $VD_{ST}^t$ of the virtual viewpoint with the depth image $VD_G^t$ of the virtual viewpoint from which ghost phenomenon is removed, as shown in Equation 18 below:

$$VD^t_{ST}(\hat{m}) = \begin{cases} VD^t_{GTB}(\hat{m}) & \text{if } A \leq VD^t_{GTB}(\hat{m}) \leq B \\ VD^t_G(\hat{m}) & \text{otherwise} \end{cases} \quad \text{[Equation 18]}$$

where A and B may be defined as $VD_{SB,min}^t(\hat{m})$ and $VD_{SB,max}^t(\hat{m})$, respectively.

Here, the spatio-temporal-background-color image of the virtual viewpoint may be acquired through a process of comparing the similarity between the temporal-background-depth image $VD_{GTB}^t$ of the virtual viewpoint and the spatial-background-depth images $VD_{SB,max}^t$ and $VD_{SB,min}^t$ of the virtual viewpoint, updating the spatio-temporal-background-color image of the virtual viewpoint with the temporal-background-color image of the virtual viewpoint when the temporal-background-depth image $VD_{GTB}^t$ of the virtual viewpoint is between the lower limit and the upper limit of the spatial-background-depth images of the virtual view point, and otherwise updating the spatio-temporal-background-color image of the virtual viewpoint with the color image of the virtual viewpoint from which ghost phenomenon is removed, as shown in Equation 19 below:

$$VC^t_{ST}(\hat{m}) = \begin{cases} VC^t_{GTB}(\hat{m}) & \text{if } A \leq VD^t_{GTB}(\hat{m}) \leq B \\ VC^t_G(\hat{m}) & \text{otherwise} \end{cases}. \quad \text{[Equation 19]}$$

Last, the secondary hole filling unit 180 performs an in-painting action based on a priority function including a depth term to perform a hole filling action on remaining holes.

In detail, in order to determine a hole filling order, the secondary hole filling unit 180 sets a patch $\Psi_p$ with a size of M×N centering on each hidden boundary region pixel of a spatio-temporal color image $VC_{ST}^t$ of the virtual viewpoint, as shown in FIG. 11A, and then determines a priority thereof, as shown in Equation 20 below:

$$Pri(p) = C(p)D(p)z(d) \quad \text{[Equation 20]}$$

where $p = VC_{ST}^t(\hat{m})$ is a color pixel of a hidden boundary region, and d is a value $VD_{SB,max}^t$ corresponding to p. In the priority function of Equation 20, C(p) is a reliability term, D(p) is a data term, and Z(p) is a depth term.

As described above, according to an embodiment of the present disclosure, the priority is determined by using the depth term in addition to the reliability term and the data term. The reliability term may be defined as a percentage of a non-hole region in the patch by Equation 21 below:

$$C(p) = \frac{|\Phi_p|}{|\psi_p|} \quad \text{[Equation 21]}$$

where $|\Phi_p|$ and $|\psi_p|$ are areas of $\Phi_p$ and $\psi_p$, respectively. According to Equation 21, the reliability term has a higher priority as a percentage of a non-hole region in a hidden patch increases.

The data term may be defined by Equation 22 below:

$$D(p) = \frac{<\nabla F_p^\perp, n_p>}{\lambda} \quad \text{[Equation 22]}$$

where $n_p$ is a normal unit vector of $\delta\Omega$ (a boundary surface of an isolated region), and $\nabla F_p^\perp$ is the same isophote as the center of $\psi_p$. Therefore, when $\nabla F_p^\perp$ and a normal vector $n_p$ have the same direction, D(p) has the largest value. In Equation 22, $\lambda$ is a normalization factor and may be set to be $\lambda=(2^n-1)$ when one pixel is typically represented by n bits. Since a similar patch is likely to be present in a certain search region of a hidden patch present in a static region, such a setting is effective for starting a hole filling action starting from a background patch. In order to reflect such a characteristic in the priority function, the depth term may be defined by Equation 23 below:

$$Z(d) = \exp(-|\psi_{p,max} - d|^2),$$

$$\psi_{p,max} = \max_{\tilde{n}\in\psi_d} VD_{SB,max}^t(\tilde{n}),$$

$$\text{subject to } VD_{ST}^t(\tilde{n}) = \text{'hole'}, \quad \text{[Equation 23]}$$

where $\Psi_d$ is a patch having depth information d corresponding to $\Psi_d$ as a center thereof.

As described above, when a priority is determined using a priority function including a reliability term, a data term, and a depth term, an in-painting process for a hidden boundary region pixel is performed according to the determined priority, and a hole filling action is performed on remaining holes.

For example, when $p \in VC_{ST}^t$ has the highest priority, the patch $\psi_p$ having p as a center thereof, as shown in FIG. 11A, is divided into a non-hole region $\Phi_p = [p_1, \ldots, p_k]^T$ and a hole region $\Omega_p = [p_{k+1}, \ldots, p_{MN}]^T$, and $\Phi_q = [q_1, \ldots, q_k]^T$ and $\Omega_q = [q_{k+1}, \ldots, q_{MN}]^T$ are set such that the patch $\psi_{q'}$ having a pixel p' in a search region $S_p$ as a center thereof corresponds to $\Phi_p$ and $\Omega_p$. In the search region, a region that is the most similar to $\Phi_p$ may be determined by Equation 24 below:

$$\Phi_q = \operatorname{argmin}_{\Phi_q \in S_p} \|\Phi_p - \Phi_q\|^2. \quad \text{[Equation 24]}$$

As a result of Equation 24, a hole region $\Omega_p$ of $\psi_p$ may be filled with a hole region $\Omega_q$ corresponding to $\Phi_q$, as shown in FIG. 12B.

As described above, a process of filling all of the remaining holes may be sequentially performed using the process of determining a priority and performing in-painting.

The hole filling method according to an embodiment of the present disclosure will be described below.

Figure 12:
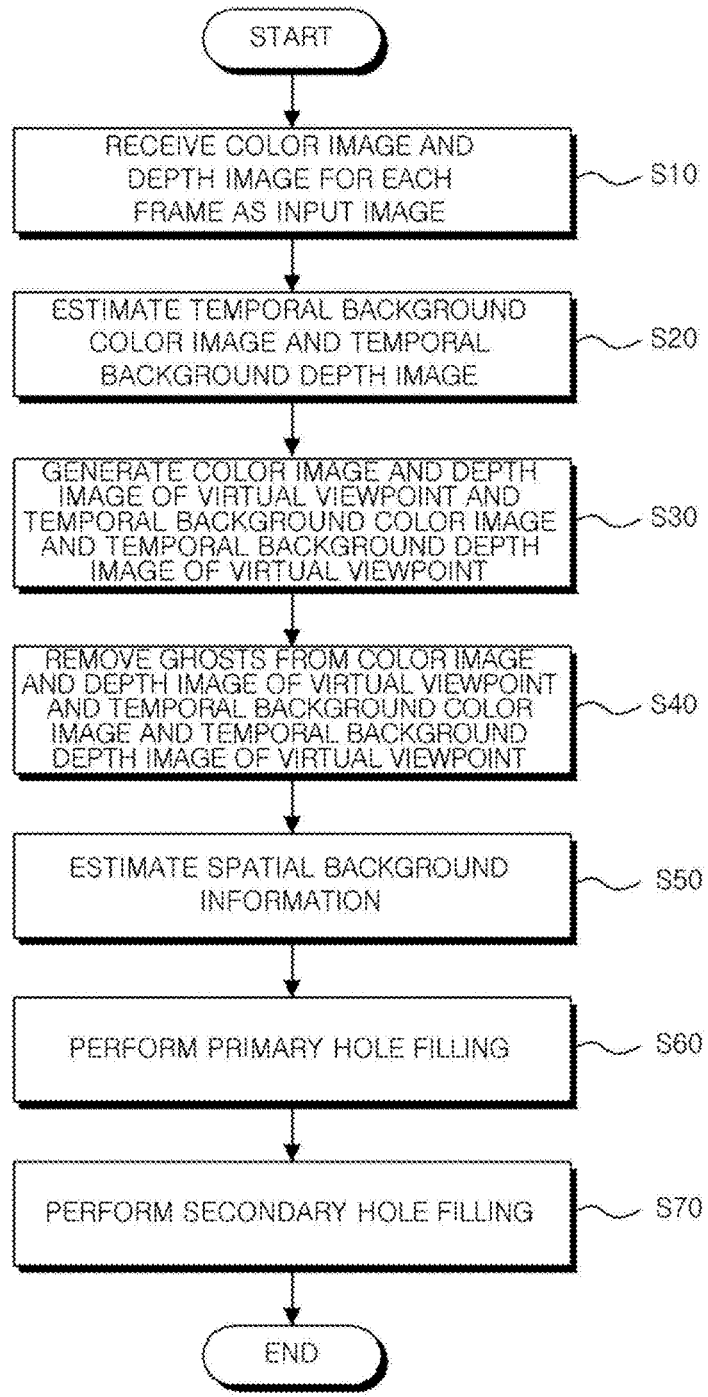
FIG. 12 is a flowchart illustrating a hole filling method using estimated spatio-temporal background information according to an embodiment of the present disclosure.

FIG. 12 is a flowchart illustrating a hole filling method using estimated spatio-temporal background information according to an embodiment of the present disclosure.

Since the hole filling method using estimated spatio-temporal background information according to an embodiment of the present disclosure is performed by substantially the same configuration as that of the hole filling apparatus 100 shown in FIG. 1, like reference numerals are assigned to like elements of the hole filling apparatus 100 of FIG. 1, and thus a repeated description thereof will be omitted.

In the hole filling method using the estimated spatio-temporal background information according to an embodiment of the present disclosure, first, the hole filling apparatus 100 receives a color image for each frame and a depth image including depth map information corresponding to the color image as input images (S10).

Each of the images input to the hole filling apparatus 100 is sent to the temporal background information estimation unit 110 and the 3D warping unit 120.

The temporal background information estimation unit 110 extracts a background codebook for each non-overlapping patch by using a color image and depth image for each frame of the input image and estimates a temporal-background-color image and a temporal-background-depth image by using the extracted background codebook (S20).

In S20, after generating the codebook for each of the non-overlapping patches by using the color image and depth image per each of the frames of the input image, the temporal background information estimation unit 110 may separate a background codebook from the generated codebook and estimate temporal background information by using the separated background codebook.

Here, the codebook may be generated through a process of the temporal background information estimation unit 110 finding a codeword corresponding to a non-overlapping patch $P_i$ of a current frame from a codebook of non-overlapping patches $P_i$ with respect to each of the non-overlapping patches $P_i$, adding the codeword of the non-overlapping patch $P_i$ of the current frame when there is no corresponding codeword, and increasing an occurrence frequency of a corresponding codeword by one when the corresponding codeword is present.

Also, the temporal background information may be estimated through a process of the temporal background information estimation unit 110 finding a codeword corresponding to the non-overlapping patch $P_i$ of the current frame from the codebook of the non-overlapping patches $P_i$ with respect to each of the non-overlapping patches $P_i$, determining that a color image and a depth image of the non-overlapping patch $P_i$ of the current frame are temporal background information of the non-overlapping patch $P_i$ of the current frame, calculating similarity with temporal background depth information of a preceding frame of the non-overlapping patch $P_i$ when there is no corresponding codeword, and replacing the temporal background information of the current frame of the non-overlapping patch $P_i$ with temporal background information of the preceding frame when the similarity is high.

When the temporal-background-color image and the temporal-background-depth image are estimated in S20, the temporal background information estimation unit 110 sends the estimated temporal-background-color image and temporal-background-depth image to the 3D warping unit 130.

When the color image and depth image are received in S10, the 3D warping unit 120 performs a 3D warping action on the color image and the depth image to generate a color image and a depth image of a virtual viewpoint. When the temporal-background-color image and the temporal-background-depth image are received in S20, the 3D warping unit 120 performs a 3D warping action on the temporal-background-color image and the temporal-background-depth image to generate a temporal-background-color image and temporal-background-depth image of the virtual viewpoint (S30).

Subsequently, the ghost removal unit 140 removes a ghost phenomenon from the color image of the virtual viewpoint and the depth image of the virtual viewpoint, which are received from the 3D warping unit 120, and the ghost removal unit 150 removes a ghost phenomenon from the temporal-background-color image and temporal-background-depth image of the virtual viewpoint, which are received from the 3D warping unit 130 (S40).

A process of removing the ghost phenomenon from the color image of the virtual viewpoint and the depth image of the virtual viewpoint in S40 is as follows.

First, the ghost removal unit 140 obtains a binary image from the color image or depth image of the virtual viewpoint, generates a boundary mask by using the binary image, labels each hidden boundary region by using the generated boundary mask, and obtains position information of boundary pixels of a foreground region and a background region.

Also, the ghost removal unit 140 defines a rectangle including each of the labeled hidden boundary regions, subdivides the rectangle into non-overlapping child rectangles, divides depth information of each of the child rectangles into a low-depth cluster and a high-depth cluster, and removes the ghost phenomenon from a background boundary region in each of the child rectangles by using a minimum depth value of the high-depth cluster as a threshold value.

A process of removing the ghost phenomenon from the temporal-background-color image and temporal-background-depth image of the virtual viewpoint in S40 is as follows.

First, the ghost removal unit 150 obtains a binary image from the temporal-background-color image or depth image of the virtual viewpoint, generates a boundary mask by using the binary image, labels each hidden boundary region by using the generated boundary mask, and obtains position information of boundary pixels of a foreground region and a background region.

Also, the ghost removal unit 140 defines a rectangle including each of the labeled hidden boundary regions, subdivides the rectangle into non-overlapping child rectangles, divides depth information of each of the child rectangles into a low-depth cluster and a high-depth cluster, and removes the ghost phenomenon from a background boundary region in each of the child rectangles by using a minimum depth value of the high-depth cluster as a threshold value.

When the ghost phenomenon is removed from the color image of the virtual viewpoint and the depth image of the virtual viewpoint in S40, the ghost removal unit 140 sends the depth image of the virtual viewpoint from which ghost phenomenon is removed to the spatial background information estimation unit 160 and also sends the color image of the virtual viewpoint from which ghost phenomenon is removed to the primary hole filling unit 170. Also, when the ghost phenomenon is removed from the temporal-background-color image and temporal-background-depth image of the virtual viewpoint, the ghost removal unit 150 sends the temporal-background-color image and temporal-background-depth image of the virtual viewpoint from which ghost phenomenon is removed to the primary hole filling unit 170.

When the depth image of the virtual viewpoint from which ghost phenomenon is removed is received in S40, the spatial background information estimation unit 160 estimates spatial background information in each hidden region of the depth image of the virtual viewpoint from which ghost phenomenon is removed (S50).

In S50, the spatial background information estimation unit 160 obtains a binary mask from the depth image of the virtual viewpoint from which the ghost phenomenon is removed, labels each hidden region by using the binary mask, and obtains position information of each of the hidden regions. Also, the spatial background information estimation unit 160 defines a rectangle including each of the labeled hidden regions, subdivides the rectangle into non-overlapping child rectangles, divides depth information of each of the child rectangles into a low-depth cluster and a high-depth cluster, and estimates a lower limit and an upper limit of spatial-background-depth images of the virtual viewpoint by using maximum and minimum values of depth information of the low-depth cluster.

The estimated lower limit and upper limit of the spatial-background-depth images are received by the primary hole filling unit 170.

When the estimated lower limit and upper limit of the spatial-background-depth images are received from the spatial background information estimation unit 160 in S50, the primary hole filling unit 170 acquires a temporal-background-color image and temporal-background-depth image of the virtual viewpoint by using similarity between the temporal-background-depth image of the virtual viewpoint received from the ghost removal unit 150 and the spatial-background-depth images of the virtual viewpoint received from the spatial background information estimation unit 160, and then performs a primary hole filling action (S60).

In S60, the primary hole filling unit 170 may compare the similarity between the temporal-background-depth image of the virtual viewpoint and the spatial-background-depth images of the virtual viewpoint, update the spatio-temporal-background-depth image of the virtual viewpoint with the temporal-background-depth image of the virtual viewpoint when the temporal-background-depth image of the virtual viewpoint is between a lower limit and an upper limit of the spatial-background-depth images, and otherwise update the spatio-temporal-background-depth image of the virtual viewpoint with the depth image of the view point from which ghost phenomenon is removed.

The primary hole filling unit 170 may compare the similarity between the temporal-background-depth image of the virtual viewpoint and the spatial-background-depth images of the virtual viewpoint, update the spatio-temporal-background-color image of the virtual viewpoint with the temporal-background-color image of the virtual viewpoint when the temporal-background-depth image of the virtual viewpoint is between the lower limit and the upper limit of the spatial-background-depth images, and otherwise update the spatio-temporal-background-color image of the virtual viewpoint with the color image of the view point from which ghost phenomenon is removed.

Subsequently, the secondary hole filling unit 180 performs an in-painting action based on a priority function including a depth term to perform a hole filling action on remaining holes present in the spatio-temporal-background-color image and spatio-temporal-background-depth image of the virtual viewpoint that are synthesized via S60 (S70).

In S70, the secondary hole filling unit 180 may set a non-overlapping patch centering on each hidden boundary region pixel of the spatio-temporal color image of the virtual viewpoint, determine a priority of each of the non-overlapping patched by using a priority function including a reliability term, a data term, and a depth term, and perform an in-painting action on each of the hidden boundary region pixels according to the determined priority to perform a hole filling action on the remaining holes.

According to the hole filling method using estimated spatio-temporal background information and a recording medium and apparatus for performing the same, it is possible to effectively fill holes of a background region, remove ghosts from a 3D warped image through an adaptive depth-image-based filter method, and effectively fill the remaining holes through an in-painting action using a priority function including a depth term by estimating temporal background information, estimating spatial background information, and merging the temporal background information and the spatial background information to perform a hole filling process.

The hole filling method using the estimated spatio-temporal background information according to an embodiment of the present disclosure may be implemented as an application or implemented in the form of program instructions that may be executed through various computer components and may be recorded on a computer-readable recording medium. The computer-readable recoding medium may also include a program instruction, a data file, a data structure, or combinations thereof.

The program instructions recorded on the computer-readable recording medium may be specifically designed for the present disclosure, or may be well-known to and used by those skilled in the art of computer software.

Examples of the computer-readable storage medium include a magnetic medium, such as a hard disk, a floppy disk, and a magnetic tape, an optical recording medium, such as a compact disc read-only memory (CD-ROM) and a digital versatile disc (DVD), a magneto-optical medium, such as a floptical disk, and a hardware device specially configured to store and perform a program instruction, such as a ROM, a random-access memory (RAM), and a flash memory.

Examples of the program instructions include not only machine code generated by a compiler or the like, but also high-level language codes that may be executed by a computer using an interpreter or the like. The above exemplary hardware device can be configured to operate as one or more software modules in order to perform processing according to the present disclosure, and vice versa.

Although the present disclosure has been described with reference to example embodiments, it should be understood that various changes and modifications may be made herein without departing from the scope and spirit of the present disclosure defined in the appended claims.

What is claimed is:

1. A hole filling method using estimated spatio-temporal background information, wherein each frame of an input image includes a color image and a depth image and is divided into non-overlapping patches, the hole filling method comprising:
    a temporal background information estimation step of extracting a background codebook for each of non-overlapping patches by using the color image and the depth image per each frame of the input image, and estimating a temporal-background color image and a temporal-background depth image by using the background codebook which is extracted;
    a three-dimensional (3D) warping step of performing a 3D warping action on the color image and the depth image per each frame of the input image to acquire a color image of a virtual viewpoint and a depth image of the virtual viewpoint, and performing the 3D warping action on the temporal-background-color image and the temporal-background-depth image to acquire a temporal- background-color image of the virtual viewpoint and a temporal-background-depth image of the virtual viewpoint;
    a ghost removal step of removing a ghost phenomenon from the color image of the virtual view point and the depth image of the virtual viewpoint and removing the ghost phenomenon from the temporal-background-color image of the virtual view point and the temporal-background-depth image of the virtual viewpoint;
    a spatial background information estimation step of estimating spatial background information in each hidden region of the depth image of the virtual viewpoint from which the ghost phenomenon is removed;
    a primary hole filling step of acquiring a spatio-temporal-background-color image of the virtual viewpoint and a spatio-temporal-background-depth image of the virtual viewpoint by using similarity between the temporal-background-depth image of the virtual viewpoint and the spatial-background-depth images of the virtual viewpoint to perform a primary hole filling action; and
    a secondary hole filling step of performing an in-painting action based on a priority function including a depth term to perform a hole filling action on remaining holes.

2. The hole filling method of claim 1, wherein the temporal background information estimation step comprises:
    generating a codebook for each of the non-overlapping patches by using the color image and the depth image per each of the frames of the input image;
    separating the background codebook from the codebook which is generated; and
    estimating temporal background information by using the background codebook which is separated.

3. The hole filling method of claim 2, wherein the step of generating the codebook comprises finding a codeword corresponding to each of the non-overlapping patches of the input frame from the codebook of each of the non-overlapping patches by using a color distortion, a luminance similarity, and a depth similarity.

4. The hole filling method of claim 1, wherein the ghost removal step comprises:
    obtaining a binary image from the color image of the virtual viewpoint or the depth image of the virtual viewpoint;
    generating a boundary mask by using the binary image;
    labeling each hidden boundary region by using the boundary mask and obtaining position information of boundary pixels of a foreground region and a background region;
    defining a rectangle including each of the labeled hidden boundary regions;
    subdividing the rectangle into non-overlapping child rectangles;
    dividing depth information of each of the child rectangles into a low-depth cluster and a high-depth cluster; and
    removing the ghost phenomenon from a background boundary region of each of the child rectangles by using a minimum depth value of the high-depth cluster as a threshold value.

5. The hole filling method of claim 1, wherein the spatial background information estimation step comprises:
    obtaining a binary mask from the depth image of the virtual viewpoint from which the ghost phenomenon is removed;
    labeling each of the hidden regions by using the binary mask and obtaining position information of each of the hidden regions;
    defining a rectangle including each of the labeled hidden regions;
    subdividing the rectangle into non-overlapping child rectangles;
    dividing depth information of each of the child rectangles into a low-depth cluster and a high-depth cluster; and
    estimating a lower limit and an upper limit of the spatial-background-depth images of the virtual viewpoint by using minimum and maximum values of depth information of the low-depth cluster.

6. The hole filling method of claim 1, wherein the primary hole filling step comprises:

comparing the similarity between the temporal-background-depth image of the virtual viewpoint and the spatial-background-depth images of the virtual viewpoint, updating the spatio-temporal-background-depth image of the virtual viewpoint with the temporal-background-depth image of the virtual viewpoint when the temporal-background-depth image of the virtual viewpoint is between a lower limit and an upper limit of the spatial-background-depth images, and otherwise updating the spatio-temporal-background-depth image of the virtual viewpoint with the depth image of the virtual viewpoint from which the ghost phenomenon is removed; and comparing the similarity between the temporal-background-depth image of the virtual viewpoint and the spatial-background-depth images of the virtual viewpoint, updating the spatio-temporal-background-color image of the virtual viewpoint with the temporal-background-color image of the virtual viewpoint when the temporal-background-depth image of the virtual viewpoint is between the lower limit and the upper limit of the spatial-background-depth images, and otherwise updating the spatio-temporal-background-color image of the virtual viewpoint with the color image of the virtual viewpoint from which the ghost phenomenon is removed.

7. The hole filling method of claim 1, wherein the secondary hole filling step comprises:

setting the non-overlapping patches centering on each hidden boundary region pixel of a spatio-temporal color image of the virtual viewpoint;

determining a priority of each of the non-overlapping patches by using a priority function including a reliability term, a data term, and a depth term; and performing an in-painting action on each of the hidden boundary region pixels according to the determined priority to perform a hole filling action on the remaining holes.

8. A non-transitory computer-readable recording medium having recorded thereon a computer program for performing the hole filling method of any one of claims 1 to 7.

9. A hole filling apparatus using estimated spatio-temporal background information, wherein each frame of an input image includes a color image and a depth image and is divided into non-overlapping patches, the hole filling apparatus comprising:

a temporal background information estimation unit extracting a background codebook for each of non-overlapping patches by using the color image and the depth image per each frame of the input image, and estimating a temporal-background-color image and a temporal-background-depth image by using the background codebook which is extracted;

a three-dimensional (3D) warping unit performing a 3D warping action on the color image and the depth image to acquire a color image of a virtual viewpoint and the depth image of the virtual viewpoint, and perform a 3D warping action on the temporal-background-color image and the temporal-background-depth image to acquire a temporal-background-color image of the virtual viewpoint and a temporal-background-depth image of the virtual viewpoint;

a ghost removal unit removing a ghost phenomenon from the color image of the virtual viewpoint and the depth image of the virtual viewpoint and removing the ghost phenomenon from the temporal-background-color image of the virtual viewpoint and temporal-background-depth image of the virtual viewpoint;

a spatial background information estimation unit estimating spatial background information in each hidden region of the depth image of the virtual viewpoint from which the ghost phenomenon is removed;

a primary hole filling unit acquiring a spatio-temporal-background-color image of the virtual viewpoint and a spatio-temporal-background-depth image of the virtual viewpoint by using similarity between the temporal-background-depth image of the virtual viewpoint and spatial-background-depth images of the virtual viewpoint to perform a primary hole filling action; and a secondary hole filling unit performing an in-painting action based on a priority function including a depth term to perform a hole filling action on remaining holes.

10. The hole filling apparatus of claim 9, wherein the temporal background information estimation unit comprises:

a codebook generation unit generating a codebook for each of the non-overlapping patches by using the color image and depth image per each of the frames of the input image;

a background codebook separation unit separating the background codebook from the generated codebook; and an estimation unit estimating temporal background information using the separated background codebook.

11. The hole filling apparatus of claim 10, wherein the codebook generation unit finds a codeword corresponding to each of the non-overlapping patches of the input frame from the codebook of each of the non-overlapping patches by using a color distortion, a luminance similarity, and a depth similarity.

12. The hole filling apparatus of claim 9, wherein the ghost removal unit obtains a binary image from the color image of the virtual viewpoint or the depth image of the virtual viewpoint, generates a boundary mask using the binary image, labels each hidden boundary region by using the boundary mask and obtains position information of boundary pixels of a foreground region and a background region, defines a rectangle including each of the labeled hidden boundary regions, subdivides the rectangle into non-overlapping child rectangles, divides depth information of each of the child rectangles into a low-depth cluster and a high-depth cluster, and removes a ghost phenomenon from a background boundary region of each of the child rectangles by using a minimum depth value of the high-depth cluster as a threshold value.

13. The hole filling apparatus of claim 9, wherein the spatial background information estimation unit obtains a binary mask from the depth image of the virtual viewpoint from which the ghost phenomenon is removed, labels each of the hidden regions by using the binary mask and obtains position information of each of the hidden regions, defines a rectangle including each of the labeled hidden regions, subdivides the rectangle into non-overlapping child rectangles, divides depth information of each of the child rectangles into a low-depth cluster and a high-depth cluster, and estimates a lower limit and an upper limit of the spatial-background-depth images of the virtual viewpoint using minimum and maximum values of depth information of the low-depth cluster.

14. The hole filling apparatus of claim 9, wherein the primary hole filling unit:
   compares the similarity between the temporal-background-depth image of the virtual viewpoint and the spatial-background-depth images of the virtual viewpoint, updates the spatio-temporal-background-depth image of the virtual viewpoint with the temporal-background-depth image of the virtual viewpoint when the temporal-background-depth image of the virtual viewpoint is between a lower limit and an upper limit of the spatial-background-depth images, and otherwise updates the spatio-temporal-background-depth image of the virtual viewpoint with the depth image of the virtual viewpoint from which ghost phenomenon is removed; and
   compares the similarity between the temporal-background-depth image of the virtual viewpoint and the spatial-background-depth images of the virtual viewpoint, updates the spatio-temporal-background-color image of the virtual viewpoint with the temporal-background-color image of the virtual viewpoint when the temporal-background-depth image of the virtual viewpoint is between the lower limit and the upper limit of the spatial-background-depth images, and otherwise updates the spatio-temporal-background-color image of the virtual viewpoint with the color image of the virtual viewpoint from which ghost phenomenon is removed.

15. The hole filling apparatus of claim 9, wherein the secondary hole filling unit sets the non-overlapping patches centering on each hidden boundary region pixel of a spatio-temporal color image of the virtual viewpoint, determines a priority of each of the non-overlapping patches by using a priority function including a reliability term, a data term, and a depth term, and performs an in-painting action on each of the hidden boundary region pixels according to the determined priority to perform a hole filling action on the remaining holes.

* * * * *